Patented Oct. 31, 1950

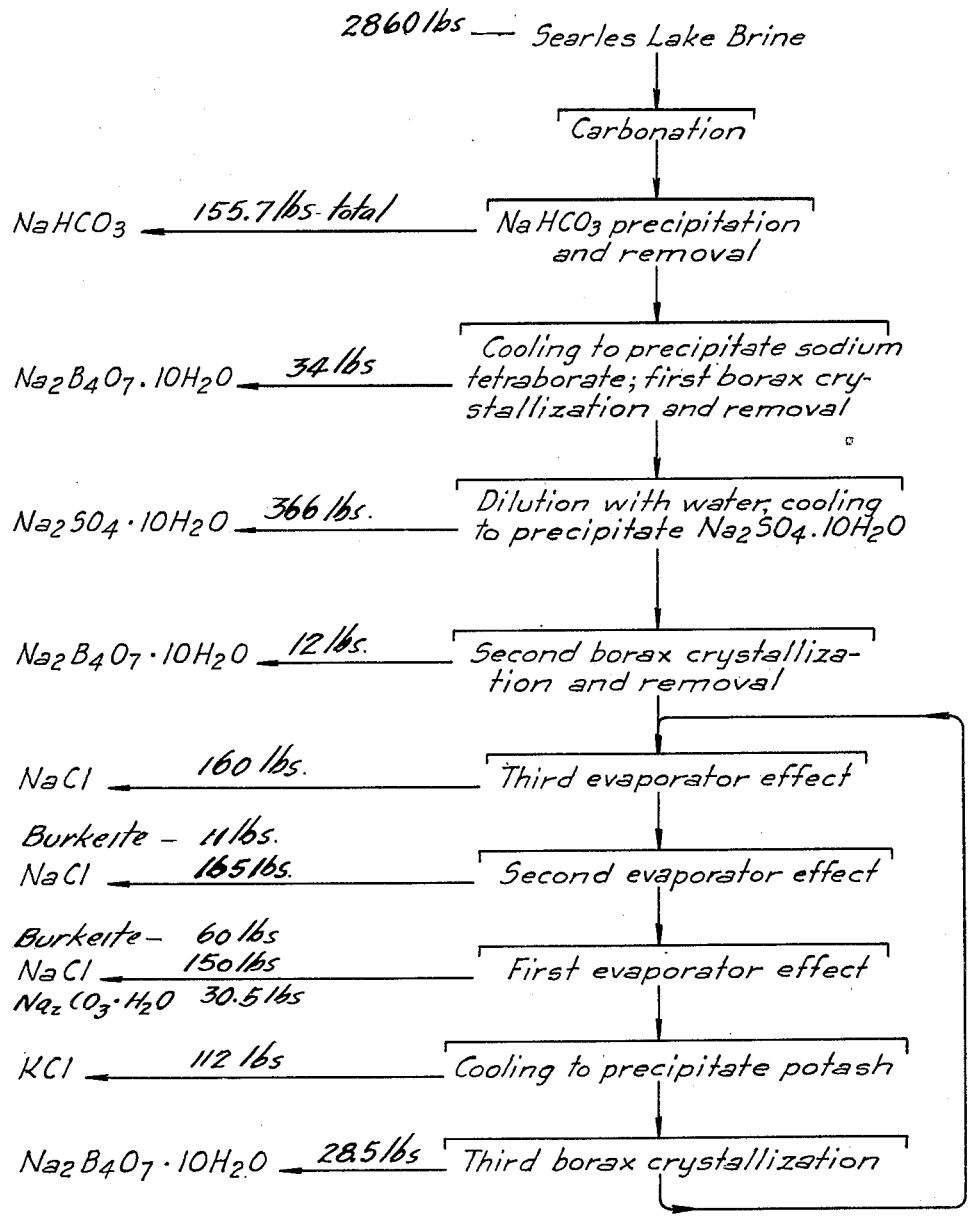

2,528,481

UNITED STATES PATENT OFFICE 2,528,481

PROCESS FOR TREATING SEARLES LAKE BRINE

James V. Wiseman, Lynn A. Blackmun, and Henry D. Hellmers, Westend, Calif., assignors to West End Chemical Company, a corporation of California Application January 6, 1948, Serial No. 746

3 Claims. (Cl. 23—59)

This invention relates to the treatment of complex alkaline brines and particularly to the treatment of that brine which is derived from Searles Lake, California to the end that one can effect from a given quanity of the brine a substantial recovery of various brine constituents in the form of commercially desirable salts such as sodium bicarbonate, sodium chloride, sodium sulfate, sodium tetraborate and potassium chloride.

The processes utilized heretofore for the recovery of valuable salts from Searles Lake Brine and which did not employ evaporation as a part of the processing have been limited to the recovery of sodium bicarbonate and borax. It has generally been considered that any process which included evaporation had to be practiced upon a brine high in sodium carbonate.

We have developed a process in which both carbonation and evaporation are practiced to secure substantially complete recovery of these desirable salts which we have mentioned. We have found that what is critical is, generally stated, the sodium carbonate to sodium sulfate ratio, that one can evaporate successfully and recover finally potassium chloride in relatively pure form and in good yield without the precipitation of glaserite, $Na_2SO_4.3K_2SO_4$, as is reported in Patent 1,712,787, if the ratio of sodium carbonate to sodium sulfate is at least 1 to 1 and preferably of the order of 1 to 0.85.

The process of this invention includes the sequential removal, in the order stated, of sodium bicarbonate, sodium tetraborate, sodium sulfate decahydrate, a second sodium tetraborate removal, and evaporation, in a multiple effect evaporator, to precipitate sodium chloride, followed by cooling to precipitate potassium chloride and sodium tetraborate; the remaining brine is mixed with the feed to the evaporator so that, in effect, a very substantial recovery of all brine constituents is attained. It is not necessary to carry on the evaporation step if one does not wish to recover the potassium chloride, for the efficient recovery of other major constituents of the brine can be accomplished without this step.

In connection with the recovery of sodium sulfate, we wish to point out that this salt crystallizes as the decahydrate, $Na_2SO_4.10H_2O$. If, following the recovery of the sodium bicarbonate and, thereafter, the recovery of the sodium tetraborate, one cools the brine to precipitate the sodium sulfate, a mixed product of sodium sulfate and sodium tetraborate will result, as was reported by Knight in Patent 1,834,161. This, we have found, is because the brine at this stage is saturated with respect to four components, sodium chloride, sodium bicarbonate, sodium sulfate and sodium tetraborate; the sodium sulfate crystallization removes water and so further concentrates the brine with the result that a further quantity of sodium bicarbonate crystallizes and the sodium sulfate and sodium tetraborate crystallize as a mixture. We have found that by first diluting the brine, the sodium tetraborate crystallization can be prevented while the sodium sulfate crystallizes from the dilute brine as the decahydrate. This is accomplished by taking advantage of the tendency of these two salts to supersaturate to a varying degree. Sodium sulfate decahydrate does not supersaturate in solution to the extent that sodium tetraborate decahydrate does; also, a solution is much easier to bring back from the unstable supersaturated condition to one of saturation or stability, this can be done merely by passing the supersaturated solution through a suspension of sodium sulfate decahydrate crystals with little or no agitation. On the other hand, sodium tetraborate supersaturates to a much larger extent in solution than sodium sulfate decahydrate and is much more sluggish to crystallize, requiring seeding, good agitation and the elapse of considerable time before the solution will again reach stability. The brine dilution should be sufficient to provide that quantity of water which is required for the sodium sulfate crystallization. This enables the process to be carried on successfully to the end that the carbonate-sulfate ratio of the brine is such as to permit of the later concentration by evaporation. We have found, for example, that, with a brine diluted with 10% of water, upon cooling to 37° F., the sulfate content in the brine will drop from 14.3 mols to 3.5 mols per 1000 mols of water. When no dilution was made, cooling the brine to 37° F. reduced the $Na_2SO_4$ content to only 4.5 mols per 1000 mols of water. In the case of no dilution, an end brine with a carbonate to sulfate ratio of 1.0 mol of sodium carbonate to 1.1 mols of sodium sulfate was obtained, whereas with the diluted brine, an end brine with a carbonate to sulfate ratio of 1.0 mol of sodium carbonate to 0.85 mol of sodium sulfate was obtained. Also, the contamination of the sodium sulfate with sodium bicarbonate results in inefficient recovery of anhydrous sodium sulfate from the Glauber's salt. Thus the sodium sulfate recovery is increased while the brine is made suitable for evaporation.

Proceeding with a brine having substantially the composition given by Teeple at page 18, The Industrial Development of Searles Lake Brine, Chemical Catalog Co., 1929, the brine should first be carbonated with carbonic acid gas to form sodium bicarbonate; for the specific details of this, one can refer to the Hellmers Patent 1,756,122. After the sodium bicarbonate has crystallized out and is separated, the brine is cooled to a suitable temperature to crystallize sodium tetraborate, as is taught in the Hellmers Patent 1,733,537; the precipitation can be facilitated by seeding the brine with borax crystals and agitating. The brine is approximately of the following composition:

| | Mols per 1000 mols H$_2$O |
|---|---|
| Na$_2$CO$_3$ | 3.2 |
| Na$_2$B$_4$O$_7$ | 1.9 |
| Na$_2$SO$_4$ | 14.3 |
| NaCl | 39.0 |

Following conclusion of the preliminary borax removal, the brine is further treated for the separation of sodium sulfate. This can be accomplished by successive cooling and crystallizing steps until finally the sodium carbonate to sodium sulfate ratio is reduced to at least 1 to 1 and is preferably of the order of 1 to 0.85 and even lower. In connection with the separation of sodium sulfate, as we have stated, it is desirable, prior to precipitation of the sodium sulfate to dilute the brine further so that only the sodium sulfate precipitates. Usually, the addition of about 10–11% of water by volume provides sufficient additional water to insure that the sodium sulfate precipitates alone and as the decahydrate.

The sodium sulfate also can be crystallized and separated by passing the diluted brine through a suspension of sodium sulfate crystals in the brine under subdued agitation and continuous cooling; these operations are effective to eliminate sodium sulfate supersaturation and to crystallize the sodium sulfate as the decahydrate.

After the separation of the sodium sulfate, the brine is at a temperature whereat it is supersaturated with respect to sodium tetraborate. This supersaturation is eliminated by again precipitating the sodium tetraborate as by seeding and crystallizing under agitation.

If desired, the crystals of sodium sulfate decahydrate can be permitted to remain in the brine, the borax being allowed to precipitate in the presence of the sulfate crystals and a hydroseparation of the two can be made by anyone skilled in the art due to the tendency of the sulfate crystals to grow to much larger size than those of the borax. We prefer, however, to keep the major portion of the borax in a state of supersaturation while making the separation of the sulfate from the brine.

After the sulfate and the borax have been removed, the brine is then subject to evaporation in multiple effect evaporators after the manner generally taught by Burke et al. in Patent 1,712,787, the brine being fed into the last effect together with residual brine. In this effect and in an intermediate effect such as the second effect, sodium chloride is precipitated; any burkeite present (Na$_2$CO$_3$.2Na$_2$SO$_4$) can be washed out with water. The liquor withdrawn from the first effect will be at a temperature of about 110° C. while the KCl is at a concentration just below that at which the brine is saturated at this temperature. The brine is then cooled to about 30° to precipitate potassium chloride; if a vacuum crystallizer is employed, water should be added first to the brine in equivalent amount to effect evaporation. After the KCl has been removed, seeding and agitation is effective to precipitate sodium tetraborate without any additional cooling, because the total borax content of the brine is low as compared to that present in the brine employed by Burke et al. in Patent 1,712,787. The remaining brine is returned to the last effect so that, theoretically at least, the brine is completely evaporated.

In a three effect evaporator, the third effect will precipitate nothing but sodium chloride. The second effect will precipitate only a very small amount of burkeite with the sodium chloride, while the first effect produces a mixture of sodium chloride, burkeite and sodium carbonate monohydrate. If a substantially pure sodium chloride is desired, the product from the second and third effects can be washed with water and sodium chloride obtained that is virtually free of sulfates and carbonates.

As a specific example, illustrative of practice of the invention, the following is set forth in conjunction with the flow-scheme shown in the single figure of the drawing. Two thousand, eight hundred sixty pounds of Searles Lake brine, containing 475 pounds NaCl, 215 pounds Na$_2$SO$_4$, 130 pounds Na$_2$CO$_3$, 124 pounds KCl and 78 pounds of borax, were fed into a carbonation tower wherein it was carbonated at a pressure of 40–45 pounds gage to convert the sodium carbonate present to sodium bicarbonate. The carbonated brine was then passed into a classifier wherein a first crop of sodium bicarbonate crystals was recovered, the crop weighing 143 pounds. The brine was then preferably further agitated, air being bubbled in, and a second crop of bicarbonate crystals, weighing 12.7 pounds, was recovered after six hours; this operation is the subject of the Blackmun application Serial No. 699,283, filed September 25, 1946.

After removal of the sodium bicarbonate, the pH of the brine was corrected, as taught in Hellmers Patent 1,756,122, and the brine cooled to 16° C. to precipitate sodium tetraborate, the crystallization being aided by seeding and slow agitation. The brine, after separation of 34 pounds of borax, was diluted with water, one-tenth the brine volume being added. The brine was then passed into a cooling and agitating device containing sodium sulfate crystals in suspension; in this apparatus, the sodium sulfate crystallized as the decahydrate, the brine temperature being reduced to 3° C. and the sulfate content to about 1.8% sodium sulfate, 366 pounds of sodium sulfate decahydrate being recovered. The brine was still supersaturated with borax; this was reduced by seeding, agitation and borax crystallization, 12 pounds of borax being recovered. The brine from the second borax recovery step was then passed through heater stages countercurrent to brine enroute to the first borax crystallization to recover the heat and warm the brine before it is passed to the evaporators.

The end liquor from the evaporators, mixed with the brine, was then introduced into the third evaporator effect. Reference can be made to Patent 1,712,787 for details of the evaporation. The brine is successively heated in the three effects to about 50° C., about 85° and 110° C.; the brine was transferred from one effect to another before glaserite formation could begin at the prevailing temperature and concentration. One hundred sixty pounds of sodium chloride were obtained from the third effect; 165 pounds of sodium chloride and 11 pounds of burkeite were obtained from the second effect; 150 pounds of sodium chloride, 60 pounds of burkeite and 30.5 pounds of sodium carbonate monohydrate were obtained in the first effect. The liquor was withdrawn from the first effect at 110° C. and cooled to 30° C. to precipitate 112 pounds of potassium chloride, water being added for vacuum cooling. The remaining brine was then seeded with borax and agitated and a final crop of 28.5 pounds of borax recovered; the end liquor was then returned to the third effect for recycling with the feed liquor.

The following set forth the total yields from the brine:

| Salt: | Per cent by weight |
|---|---|
| NaCl | 60 |
| $Na_2SO_4$ | 75 |
| $Na_2CO_3$ | 75 |
| KCl | 90 |
| $Na_2B_4O_7$ | 90 |

From the foregoing we believe it will be apparent that we have provided a novel process for the treatment of Searles Lake and like brines to the end that a materially increased yield of useful products can be obtained.

We claim:

1. A process for treating Searles Lake or similar brine consisting in the sequentially practiced steps of carbonating the brine with $CO_2$ to precipitate sodium bicarbonate and separating the precipitated sodium bicarbonate from the brine; cooling the brine to crystallize sodium tetraborate from the brine and separating the crystallized sodium tetraborate from the brine; diluting the brine with water, cooling the diluted brine to crystallize sodium sulfate decahydrate from the brine to provide a brine having an $Na_2SO_4$ to $Na_2CO_3$ ratio by weight of the order of 1 to 1; the quantity of water added to dilute the brine being equal substantially to that removed from the brine upon the aforesaid crystallization of sodium sulfate decahydrate; crystallizing and separating additional sodium tetraborate from the brine; evaporating the brine to concentrate the same in a triple effect evaporator, first at a temperature of about 50° C., then about 85° C., and finally about 110° C., transferring the brine to a successive temperature effect before glaserite formation begins at the prevailing temperature and concentration in a given effect, cooling the concentrated brine to about 30° C. to precipitate potassium chloride and separating the potassium chloride.

2. A process for treating Searles Lake brine consisting in the sequentially practiced steps of carbonating the brine with $CO_2$ to precipitate sodium bicarbonate and separating the precipitated sodium bicarbonate from the brine; cooling the brine to crystallize sodium tetraborate from the brine; diluting the brine with about 10% of water, cooling the diluted brine to crystallize sodium sulfate decahydrate and separating the crystallized sodium sulfate decahydrate from the brine to provide a brine having a sodium sulfate to sodium carbonate ratio of the order of 1 to 0.85; crystallizing and separating additional sodium tetraborate from the brine; evaporating the brine in a triple effect evaporator, first at a temperature of about 50° C., then about 85° C., and finally about 110° C., transferring the brine to a successive temperature effect before glaserite formation begins at the prevailing temperature and concentration in a given effect; cooling the concentrated brine to about 30° C. to precipitate potassium chloride and separating the potassium chloride; seeding the remaining brine with borax crystals and agitating to crystallize borax without further cooling, separating borax crystals, and returning the remaining brine to the initial evaporator effect.

3. The improvement in the treatment of Searles Lake brine which consists in the sequential steps of diluting a brine containing, per 1,000 mols of water, about 4.1 mols of $Na_2CO_3$, 1.06 mols of $Na_2B_4O_7$, 14.3 mols of $Na_2SO_4$, and potassium chloride with water sufficient to supply the water utilized for precipitation of sodium sulfate as the decahydrate; cooling the diluted brine to precipitate sodium sulfate decahydrate and provide a brine having a sodium sulfate to sodium carbonate ratio of less than 1 to 0.85; separating the precipitated sodium sulfate decahydrate crystals; then evaporating the brine while avoiding precipitation of glaserite; and cooling the evaporated brine to precipitate potassium chloride.

JAMES V. WISEMAN.
LYNN A. BLACKMUN.
HENRY D. HELLMERS.

REFERENCES CITED

The following references are of record in the file of this patent:

UNITED STATES PATENTS

| Number | Name | Date |
|---|---|---|
| 1,215,544 | Jones et al. | Feb. 13, 1917 |
| 1,594,707 | Binder | Aug. 3, 1926 |
| 1,712,787 | Burke et al. | May 14, 1929 |
| 1,733,537 | Hellmers | Oct. 29, 1929 |
| 1,834,161 | Knight | Dec. 1, 1931 |
| 1,836,426 | Allen et al. | Dec. 15, 1931 |
| 2,089,557 | Jacobi | Aug. 10, 1937 |
| 2,104,009 | Burke et al. | Jan. 4, 1938 |
| 2,309,569 | Black et al. | Jan. 26, 1943 |
| 2,392,888 | Suhr et al. | Jan. 15, 1946 |